June 20, 1961

C. L. ROBINSON 2,988,935

PORTABLE DRILLING TOOL

Filed Sept. 3, 1957

INVENTOR.
CLAUDE L. ROBINSON
BY
*Charles W. Walton*
ATTORNEY

June 20, 1961
C. L. ROBINSON
2,988,935
PORTABLE DRILLING TOOL
Filed Sept. 3, 1957
3 Sheets-Sheet 2
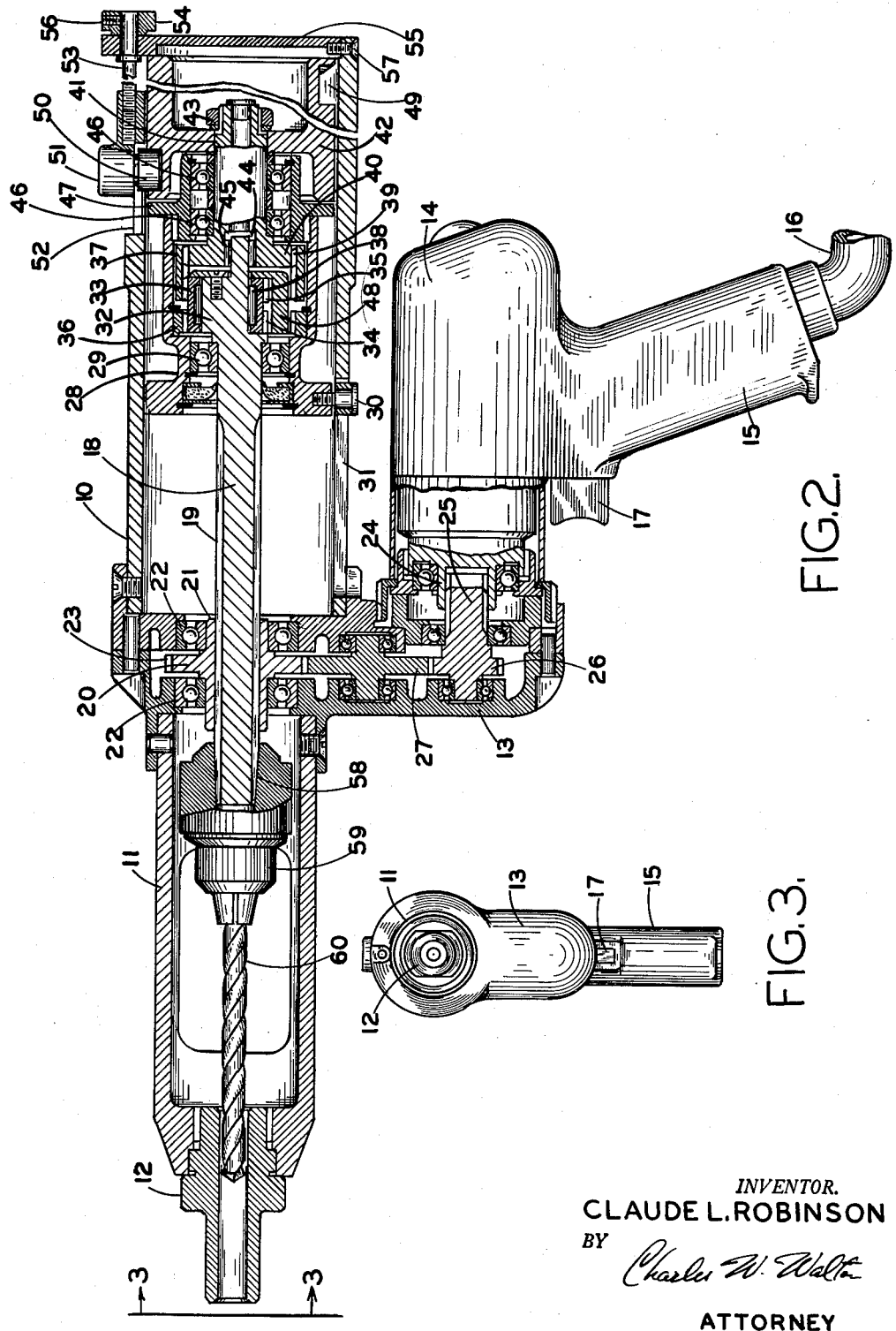
INVENTOR.
CLAUDE L. ROBINSON
BY
Charles W. Walton
ATTORNEY June 20, 1961 C. L. ROBINSON 2,988,935
PORTABLE DRILLING TOOL
Filed Sept. 3, 1957 3 Sheets-Sheet 3

INVENTOR.
CLAUDE L. ROBINSON
BY
ATTORNEY

2,988,935
PORTABLE DRILLING TOOL
Claude L. Robinson, Spring Lake Township, Ottawa County, Mich., assignor to Gardner-Denver Company, Quincy, Ill., a corporation of Delaware
Filed Sept. 3, 1957, Ser. No. 681,684
7 Claims. (Cl. 77—34.1)

This invention relates generally to tools of the type intended for performing drilling and similar operations and more particularly to a portable tool for advancing and retracting a rotatable cutting element with respect to a work piece.

It is a general object of this invention to provide a novel device for positively feeding and retracting a cutting element.

It is a further object of this invention to provide cam means for controlling the depth of cut and the rate of feeding and retracting of a drilling element.

A still further object is the provision of a novel device of simple and compact construction suitable for controlled drilling in a repetitive pattern.

Further objects and advantages of this invention will become apparent from the following specifications and by reference to the accompanying drawings in which:

FIG. 1 is a side elevational view of a drilling device embodying the features of this invention in combination with a rotary driver;

FIG. 2 is a central longitudinal section through the device shown in FIG. 1 with the driver 14 sliding member 51 and chuck 59 partly in elevation;

FIG. 3 is an end elevation of the drilling device and driver as shown in FIG. 1 looking in the direction of line 3—3 of FIG. 2;

While the invention herein disclosed and claimed is susceptible of various modifications and constructions, the illustrative embodiment which has been made and tested is herein described to show the concepts and principles involved. However, it is not intended that the scope of the invention be limited to this specific embodiment but rather it is intended that various alternate and modified constructions shall fall within the scope of the appended claims.

In modern day industrial plants, portable or hand-held tools play an important role in many applications. These tools are particularly useful in fields where production is limited or design changes are frequent so that the use of special purpose machine tools is impractical. This is particularly true in the aircraft industry, and to a lesser extent in the automotive industry, wherein the practice has been adopted of using portable self-contained tools in conjunction with readily fabricated and alterable jigs and fixtures for performing drilling and allied operations.

Portable tools for advancing and retracting a spindle have been commercially successful for a number of years. However, many of these tools are quite complicated and expensive in providing adjustment means for controlling rates of feed and depths of drilling. Some of these prior devices use fluid pressure means for advancing and retracting the drill, however, with the increasing use of harder metals, mechanical, positive feeding of the drilling tools has become extremely important.

Figure 1:
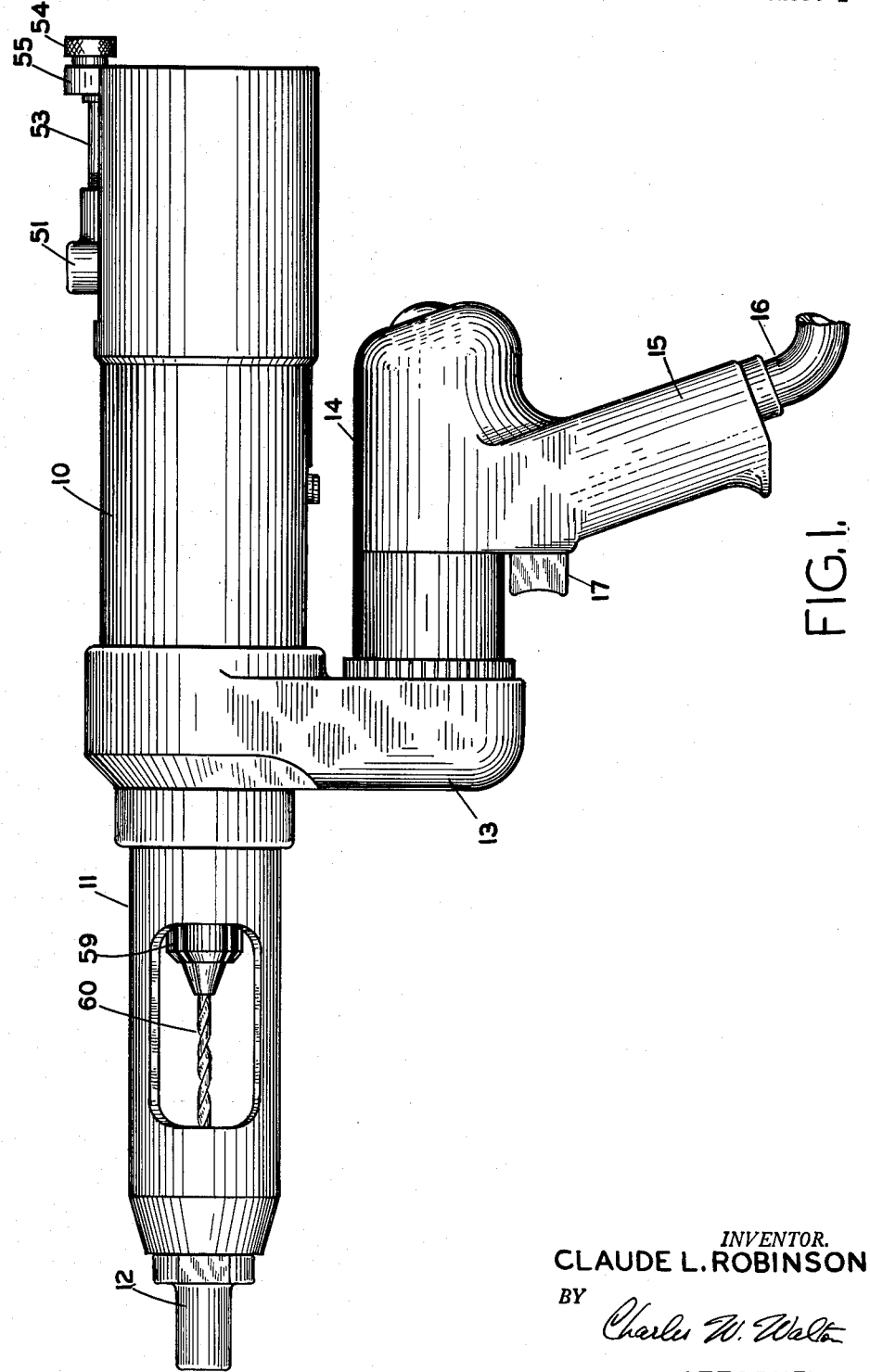
Figure 4:
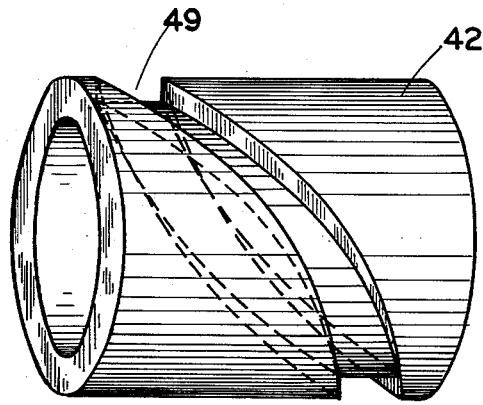
FIG. 4 is a perspective view of the cylindrical cam 42 of the device as shown in FIG. 2.

The invention hereinafter described is extremely simple in operation and provides a positive mechanical control for the advancing and retracting of a drilling spindle. Referring to the drawings, FIG. 1 shows an elongated tubular housing 10. A forwardly projecting extension or nose piece 11 is attached to the housing and is adapted to receive at its forward end a suitable drill bushing tip 12. The drill bushing tip 12 serves as a drill guide and also permits the entire device to be attached to and supported by a jig or fixture as may be required for use for the particular drilling job to be accomplished.

A casing 13 projects radially from the housing 11 and is designed to receive one end of a standard motor unit 14. In the illustrative embodiment the portable motor unit 14 with a dependent handle 15 is shown attached to the housing 13 so that the complete drilling unit may be handled and used as a hand-held tool. Fluid pressure is supplied to the motor 14 through an air hose 16 connected to a source of fluid pressure, not shown. A throttle 17 controls the admission of pressure fluid to the motor unit. It will be obvious that in some instances it will be desirable to eliminate the depending handle assembly 15 to provide a more compact drilling unit. This is one of the advantages of the embodiment shown in that the driving or motor unit is readily changeable without disturbing the feeding and retracting unit enclosed within the housing 11. The motor unit may also be changed to provide different driving speeds.

Enclosed within the housing 10 is a drilling spindle 18 having longitudinal external grooves 19 about its periphery. The forward portion of the fluted spindle 18 is supported within a gear 20 having internal longitudinal splines 21 to permit the spindle 18 to reciprocate axially therein while maintaining a driving engagement between spindle 18 and gear 20. The gear 20 is rotatably supported with respect to the housing 10 by a pair of ball bearings 22. The gear 20 is further provided with external teeth 23.

As shown in FIG. 2, a forwardly extending shaft 24 of motor unit 14 engages and drives a shaft 25 of a spur gear 26 within the casing 13. The spur gear 26 drives an idler gear 27 also within the casing 13 which in turn engages the teeth 23 of gear 20 whereby to drive the spindle 18. In the embodiment shown the shaft 24 of motor unit 14 is driven at 1000 revolutions per minute and the gears 26, 27 and 20 provide a 2:1 reduction to drive the spindle 18 at 500 revolutions per minute.

The rearward end of the spindle 18 is supported in a gear housing 28 by a ball bearing 29. The gear housing 28 is prevented from rotating in the housing 10 by a guide pin 30 carried by the gear housing and projecting through a longitudinal slot 31 in the housing 10. An eccentric portion 32 on the spindle 18 drives an epicyclic gear system as described hereafter. An internal gear 33 has two sets of external teeth 34 and 35 of different pitches which mesh respectively with a ring gear 36, fixed with respect to gear housing 28, and an output ring gear 37 which is rotatable with respect to gear housing 28. The internal gear 33 rotates with the eccentric portion 32 and is rotatably mounted on the same by means of a roller bearing 38. The output ring gear 37 engages teeth 39 hobbed on a flange 40 at one end of a cam shaft 41. A cam 42 is held onto cam shaft 41 and rotatable therewith by means of a spline connection and a nut 43. The rearward end of spindle 18 is received and further supported in a recess 44 in cam shaft 41 to maintain alignment of the spindle 18 with respect to housing 10 and a roller bearing 45 in said recess permits different speeds of rotation of these members. The cam shaft 41 is in turn supported within ball bearings 46 supported by a carrier 47 which is mounted for axial movement within housing 10. An eccentric counterbalancing weight 48 is attached to spindle 18 to eliminate vibration caused by rotation of the spindle 18.

Figure 5:
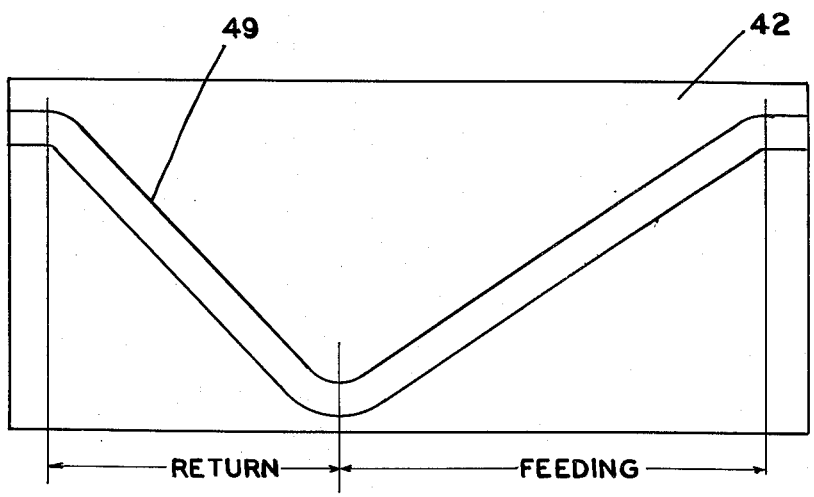
FIG. 5 is a developed view of the cam of FIG. 3 illustrating the configuration of the groove 49 for controlling the feeding and retracting of a drilling element.

The cam 42 is of cylindrical cup shape and is provided with an outwardly opening peripheral groove or track 49 which in cooperation with a cam follower 50 controls the advancement and retraction of the spindle 18 as will be hereinafter more fully described. FIG. 5 shows a developed view of the cam indicating the feeding and retracting portions of the track 49. As shown in FIG. 5, the angle of inclination of the return portion of track 49 is greater than the angle of the feeding portion which provides a rapid return of the drilling tool upon completion of the drilling operation.

The epicyclic gear construction illustrated and described provides an extreme reduction in the speed of rotation of the cam 42 as compared to the rotational speed of spindle 18. In the embodiment illustrated and made by applicant a 245:1 speed reduction was obtained so that with a spindle speed of 500 r.p.m., the rotatonal speed of the cam 42 was about 2 r.p.m.

One advantage of the construction shown and described is that the ratio of cam to spindle rotation is independent of the ratio of drive or spindle speed. The cam and spindle assembly may be easily removed from the tool without disturbing the motor and its gear train and vice versa.

The stroke control mechanism consists of a cam follower 50 of the roller bearing type mounted in a sliding member 51 and positioned to engage the cam track 49. The sliding member 51 is slidable longitudinally in an elongated slot 52 in the rearward peripheral surface of housing 10. The sliding member 51 is retained in a fixed position with respect to the housing 10 by means of an adjustment screw 53 which may be rotated by a knob 54 and is carried in a removable end plate 55 which serves as a cover plate for the housing 10. The knob 54 is retained on screw 53 by means of a set screw 56. The end plate is retained in place by a plurality of retaining screws 57.

The forward end of the spindle is tapered at 58 to receive a conventional drill chuck 59 which in turn receives a drilling bit 60.

In operation of the unit described, the drill bushing tip 12 is inserted into a jig or fixture and locked in position. Air is admitted to motor unit 14, from a source not shown, through a throttle valve, not shown, which is controlled by throttle control 17. The motor unit drives the spindle 18 through the gear train 26, 27, 20 as previously described. As the spindle rotates, the epicyclic gear train slowly rotates the cam 42. As the cam 42 rotates, cam follower 50 follows the track 49 and causes the spindle 18 and the epicyclic gearing carried thereby to advance or retract in accordance with the predetermined inclination of the groove or track 49 of the cam 42.

It will be apparent to one skilled in the art of drilling and drill design that the rate of feeding of the drill bit 60 into a work piece is dependent upon the angle of the track 49 in the peripheral surface of the cam 42. It will also be apparent that the cam track 49 may be so designed as to provide for a period of dwell or low rate of feed at the end of the drilling part of the cycle. This would permit the use of a combination drilling and countersinking tool so that these two operations may be performed in one cycle of the unit which is the subject of this invention. Thus it will be seen that a cam may be designed for each of a multitude of drilling patterns as desired by a user of the unit. Further changes in the drilling pattern may be achieved by changing the output speed of the motor unit 14, the gear train 26, 27, 20 and the gear ratio of the epicyclic gear train.

The cam 42 may be readily changed simply by removing retaining screws 57, set screws 56, knob 54, and cover plate 55. Nut 43 may then be removed to permit the removal of cam 42, sliding member 51 and cam follower 50 through the end of the housing 10.

Adjusting screw 53 and knob 54 provide for limited axial adjustment of cam 42, spindle 18 and the intermediate gearing and is used as a micrometer adjustment of the unit to control the depth of hole being drilled. It is also used to compensate for shortening of the drill bit 60 caused by resharpening of the bit.

It will also be apparent that auxiliary control features maybe added to the drilling tool. For instance, a poppet valve in the removable end plate 55 engageable by the cam 42 during the return stroke could be used to interrupt the flow of air to the motor at the end of a single cycle of the drill. Piston means engageable with the axially moveable spindle, gearing and cam assembly could also be provided to advance the unit rapidly to engage a work piece whereupon the cam would take over to control the rate of drilling.

The invention described above provides a novel, compact and useful drilling tool that is readily adaptable of a variety of drilling operations through the means of a programmed drilling cycle.

I claim as my invention:

1. A portable drilling tool comprising: an elongated tubular housing; a rotatable spindle mounted for reciprocating movement within said housing; gear means mounted in said housing for rotating said spindle; a cylindrical cam mounted for reciprocating movement with said spindle and rotated by said spindle; a follower dog mounted in said housing for engagement with said cam; and a motor mounted on said housing operatively connected to said gear means for driving said spindle whereby said cam and said spindle are reciprocated within said housing.

2. A portable drilling tool comprising: an elongated tubular housing; an assembly mounted for reciprocating movement within said tubular housing; said assembly including a rotatable spindle and a rotatable cylindrical cam operatively connected by a reduction mechanism; a follower dog mounted in said tubular housing for engagement with said cylindrical cam; gear means rotatably mounted in said tubular housing for rotating said spindle; and a motor mounted on said tubular housing operatively connected to said gear means for driving said spindle whereby said cam and said spindle are reciprocated with respect to said tubular housing.

3. A portable drilling tool comprising: an elongated tubular housing; an internal housing mounted for reciprocating movement within said tubular housing; a spindle rotatably mounted within said internal housing and extending forwardly therefrom; a cylindrical cam rotatably mounted in said internal housing and extending rearwardly therefrom; a follower dog mounted in said tubular housing for engagement with said cylindrical cam; a speed reduction mechanism in said internal housing operatively connecting said rotatable spindle and said rotatable cam; gear means rotatably mounted in said tubular housing for rotating said spindle; a motor mounted on said tubular housing operatively connected to said gear means; and said spindle driving said cam whereby said internal housing, said spindle and said cam are reciprocated with respect to said tubular housing.

4. A portable drilling tool comprising an elongated tubular housing; an internal gear housing mounted for reciprocating movement within said tubular housing; a spindle rotatably mounted in said gear housing and extending forwardly therefrom; said spindle including a splined shaft portion and having a chuck mounted at the forward end thereof for supporting a cutting element; a cylindrical cam rotatably mounted in said gear housing and extending rearwardly therefrom; a follower dog adjustably mounted on said tubular housing for engagement with said cylindrical cam; a reduction gear mechanism mounted in said gear housing operatively connecting said rotatable spindle and said rotatable cam; a gear having an internal spline rotatably mounted within said tubular housing for engagement with said splined spindle shaft; an external gear housing fixed to said tubular housing; a motor mounted on said external gear housing; a gear train in said external gear housing operatively connecting to said gear and said motor for rotating said spindle; said spindle driving said cam whereby said spindle, said internal gear housing, and said cam are reciprocated with respect to said tubular housing; and a bushing tip secured to the forward end of said tubular housing for guiding said cutting element and for mounting said drilling tool in a supporting fixture.

5. In a drilling tool, in combination, a housing member; a spindle member rotatably and reciprocably carried within said housing; operating means for rotating said spindle at a given speed; speed reduction means axially alined with said spindle and responsive to rotation of said spindle and having a portion thereof rotatable at a speed less than said given speed; and camming means rotatable with said portion and operable to longitudinally move said spindle and said speed reduction means at a predetermined speed; said camming means comprising a cylindrical cam member removably secured to said portion and axially alined therewith, and said camming means being rotatable and reciprocable with respect to said housing member.

6. The combination according to claim 5, wherein said cam member is provided with a cam track of selected configuration formed in the outer wall thereof; and said camming means further comprises a cam follower mounted on said housing and extending therefrom in interfering relationship with said cam track, whereby said spindle is advanced and retracted relative to said housing member according to the rotary speed of said cam member and the configuration of said track.

7. The invention defined in claim 6, together with adjusting means carried by said housing and cooperable with said camming means and said speed reduction means to selectively position said spindle member longitudinally with respect to said housing member.

References Cited in the file of this patent
UNITED STATES PATENTS

| | | |
|---|---|---|
| 2,234,452 | Rehnberg | Mar. 11, 1941 |
| 2,574,347 | Nelson | Nov. 6, 1951 |
| 2,791,922 | Robinson | May 14, 1957 |
| 2,811,877 | De Groff | Nov. 5, 1957 |
| 2,927,486 | Robinson | Mar. 8, 1960 |